US011971214B2

(12) United States Patent
Foss-Smith et al.

(10) Patent No.: US 11,971,214 B2
(45) Date of Patent: Apr. 30, 2024

(54) APPARATUS FOR REMOVING MOISTURE FROM PARTICULATE MATERIAL

(71) Applicant: Coomtech Limited, Welney (GB)

(72) Inventors: Patrick Foss-Smith, Welney (GB); Peter Anderson, Welney (GB)

(73) Assignee: Coomtech Limited, Welney (GB)

(*) Notice: Subject to any disclaimer, the term of this patent is extended or adjusted under 35 U.S.C. 154(b) by 1073 days.

(21) Appl. No.: 16/346,637

(22) PCT Filed: Nov. 2, 2017

(86) PCT No.: PCT/GB2017/053312
§ 371 (c)(1),
(2) Date: May 1, 2019

(87) PCT Pub. No.: WO2018/083485
PCT Pub. Date: May 11, 2018

(65) Prior Publication Data

US 2020/0056842 A1 Feb. 20, 2020

(30) Foreign Application Priority Data

Nov. 2, 2016 (GB) .................................... 1618470

(51) Int. Cl.
*F26B 17/10* (2006.01)

(52) U.S. Cl.
CPC ............ *F26B 17/10* (2013.01); *F26B 17/106* (2013.01); *F26B 17/107* (2013.01); *F23K 2201/20* (2013.01)

(58) Field of Classification Search
CPC ...... F26B 17/10; F26B 17/106; F26B 17/107; F26B 17/103; F26B 17/104; F26B 17/00;
(Continued)

(56) References Cited

U.S. PATENT DOCUMENTS

| | | |
|---|---|---|
| 2,413,420 A | 12/1946 | Stephanoff |
| 3,851,404 A | 12/1974 | Fracke et al. |

(Continued)

FOREIGN PATENT DOCUMENTS

| | | |
|---|---|---|
| FR | 1275429 A | 11/1961 |
| GB | 2494370 A | 3/2013 |

(Continued)

*Primary Examiner* — Edelmira Bosques
*Assistant Examiner* — Bao D Nguyen

(57) ABSTRACT

Moisture is removed from particulate material using an apparatus comprising a dryer having a drying chamber for directing a flow of gas-entrained particulate material between first and second ends of the drying chamber. The dryer is configured for directing gas under pressure into the drying chamber, for interacting with a flow of gas-entrained particulate material within the drying chamber. The dryer comprises a body of modular construction, which defines a plurality of guide passages arranged for fluid communication between the drying chamber and a source of gas under pressure. The body of modular construction comprises a plurality of discrete annular elements, arranged in series, one adjacent another, each having a body defining a central aperture, and wherein the annular elements are arranged together with the central apertures aligned.

15 Claims, 12 Drawing Sheets

(58) Field of Classification Search
CPC ......... F23K 2201/20; B04B 5/06; B04B 5/08; B04B 5/12
See application file for complete search history.

(56) References Cited

U.S. PATENT DOCUMENTS

| | | | |
|---|---|---|---|
| 3,974,574 | A | 8/1976 | Van Vliet et al. |
| 4,454,661 | A | 6/1984 | Klein et al. |
| 4,766,851 | A | 8/1988 | Emsperger et al. |
| 4,769,923 | A | 9/1988 | Chang |
| 2014/0223762 | A1 | 8/2014 | Hogan |
| 2014/0325867 | A1* | 11/2014 | Foss-Smith ........... F26B 17/107 34/443 |

FOREIGN PATENT DOCUMENTS

| | | | |
|---|---|---|---|
| JP | 40-720 | | 1/1965 |
| JP | 44-18721 | | 8/1969 |
| JP | 48-24363 | | 3/1973 |
| JP | 49-35302 | | 9/1974 |
| JP | 49-125274 | | 11/1974 |
| JP | S48-045956 | | 10/1980 |
| JP | 6-63301 | | 3/1994 |
| JP | 7-27476 | | 1/1995 |
| JP | 2010-214319 | A | 9/2010 |
| KR | 10-0722432 | B1 | 5/2007 |
| KR | 10-2016-0024655 | A | 3/2016 |
| RU | 2340843 | C1 | 12/2008 |
| SU | 754176 | A1 | 8/1980 |
| SU | 1255833 | A2 | 9/1986 |
| SU | 1550301 | A2 | 3/1990 |
| WO | 2012160320 | A1 | 11/2012 |

* cited by examiner

APPARATUS FOR REMOVING MOISTURE FROM PARTICULATE MATERIAL

CROSS-REFERENCE TO RELATED APPLICATION

This application is the National Stage of, and therefore claims the benefit of, International Application No. PCT/GB2017/053312 filed on Nov. 2, 2017, entitled "APPARATUS FOR REMOVING MOISTURE FROM PARTICULATE MATERIAL," which was published in English under International Publication Number WO 2018/083485 on May 11, 2018, and has a priority date of Nov. 2, 2016, based on application 1618470.7. Both of the above applications are commonly assigned with this National Stage application and are incorporated herein by reference in their entirety.

FIELD OF THE INVENTION

The present invention relates to apparatus for removing moisture from particulate material, such as coal or biomass.

BACKGROUND OF THE INVENTION

Wet coal causes significant inefficiency in coal-fired power generation boilers and supercritical water heaters. More coal has to be burned to reach the target electrical output than would be needed if the coal was dry. In addition, atmospheric emissions could be significantly reduced if the moisture content of coal could be significantly reduced.

Wet coal, and other particulate material, is traditionally dried using thermal processes to remove moisture, in particular surface moisture. However, this is very energy intensive, and so non-thermal methods are of huge value to industry.

One such method is disclosed in previous patent application GB2494370, which describes an apparatus for removing moisture, in particular surface moisture, from coal or other solid particulate materials. The apparatus described uses cold air to dry organic and inorganic feedstocks.

Trials of this system have indicated, however, that maintaining a high level of drying performance and efficiency, with high levels of throughput, is very difficult to achieve under all conditions. It has been found that different materials often have different requirements to ensure that effective and efficient drying is achieved.

SUMMARY OF THE INVENTION

According to a broadest aspect of the invention, there is provided an apparatus for removing moisture from particulate material, the apparatus comprising a dryer having a drying chamber for directing a flow of gas-entrained particulate material between first and second ends of the drying chamber.

The dryer is configured for directing gas under pressure into the drying chamber, for interacting with a flow of gas-entrained particulate material within the drying chamber.

The dryer may comprise a body of modular construction, which defines a plurality of guide passages arranged for fluid communication between the drying chamber and a source of gas under pressure.

Using a modular construction allows the configuration of the dryer body to be readily adjusted, e.g. to optimise the drying efficiency of the dryer for any given type of particulate material to be processed (or level of surface moisture content to be processed for a given type of particulate material). For example, it may be possible to lengthen or shorten the dryer body, in order to increase or decrease the amount of time that material is present within the drying chamber.

In exemplary embodiments, the configuration of the guide passages is adjustable. For example, the size of the guide passage may be adjusted, such as by increasing or decreasing the width of the guide passage. Such adjustability can be used to influence the performance parameters of the gas which flows into the drying chamber via the guide passages. As such, the configuration of the dryer body can be adjusted, to optimise the drying efficiency of the dryer for any given type of particulate material to be processed (or level of surface moisture content to be processed for a given type of particulate material).

The body of modular construction may comprise a plurality of discrete elements arranged in series, one adjacent another. Accordingly, one or more elements may be replaced and or the array of elements may be reorganised, in order to suit a desired configuration of dryer required for processing a given type (or level of surface moisture content) of particulate material.

In exemplary embodiments, the discrete elements are configured to cooperate in pairs, one element adjacent another. In exemplary embodiments, a surface from each discrete element in the pair defines at least part of a wall of the drying chamber (i.e. at a location between the first and second ends of the drying chamber).

In exemplary embodiments, one or more pairs of said plurality of elements, or each pair of said plurality of elements, defines at least one guide passage extending between first and second elements of said pair, and configured for directing gas under pressure from between said pair and into the drying chamber.

In exemplary embodiments, the drying chamber is arranged radially outboard of the body of modular construction. For example, the dryer may comprise a housing with said body of modular construction located within the housing, and with the drying chamber defining an annulus around the body of modular construction, e.g. between a radially outer surface of the body of modular construction and an internal surface of the housing. In such embodiments, the guide passages will be arranged for directing a flow of gas under pressure in a radially outward direction, into said drying chamber.

In exemplary embodiments, the dryer comprises a first type of guide passage in fluid communication with said drying chamber, wherein said first type of guide passage is configured for directing gas under pressure in a radial direction with respect to a longitudinal axis of the drying chamber, or in a radial direction with respect to a general direction of flow of gas-entrained particulate material between said first and second ends of the drying chamber.

The first type of guide passage can be used to create a radial 'blade' of gas emitting into to the drying chamber, in use.

In alternative embodiments, the dryer comprises a first type of guide passage in fluid communication with said drying chamber, wherein said first type of guide passage is configured for directing gas under pressure in an axial direction with respect to a longitudinal axis of the drying chamber, or in an axial direction with respect to a general direction of flow of gas-entrained particulate material between said first and second ends of the drying chamber.

In exemplary embodiments, the first type of guide passage has an outlet (i.e. through which gas leaves the body and enters the drying chamber) which is continuous through 360 degrees, such that the 'blade' is uninterrupted (i.e. without any gaps in the flow of gas emitted into the drying chamber). For such embodiments, the risk that some gas-entrained particulate material will not be intersected by the gas under pressure as it passes along the drying chamber is minimised. Consequently, the efficiency of the apparatus can be increased. However, the first type of guide passage may have an alternative configuration, with a non-continuous outlet (i.e. of less than 360 degrees), so as to define a discrete shaft of gas emitting into the drying chamber, in use. For such embodiments, a plurality of said first type of guide passage may be provided between each respective pair of annular elements, so as to define a plurality of discrete shafts of gas emitting into the drying chamber. The same or similar result may be provided by a further alternative embodiment, in which the first type of guide passage defines a plurality of outlets, spaced from one another (e.g. in a circumferential array), so as to define a plurality of discrete shafts of gas emitting into the drying chamber.

In exemplary embodiments, the dryer comprises a plurality of said first type of guide passage. In exemplary embodiments, at least one of said first type of guide passage is defined between a pair of said plurality of discrete elements.

In exemplary embodiments, the dryer comprises a second type of guide passage in fluid communication with said drying chamber, wherein said second type of guide passage is configured for directing gas under pressure in a tangential direction with respect to a longitudinal axis of the drying chamber, or in a tangential direction with respect to a general direction of flow of gas-entrained particulate material between said first and second ends of the drying chamber. The second type of guide element can be used to provide centrifugal force required to encourage gas-entrained particulate material to continue a helical flow path between said first and second ends of the drying chamber after being acted upon by the first type of guide passage, for example. As such, it may be advantageous to configure the discrete elements of the dryer in an array, wherein one or more of said second type of guide passage is arranged in series downstream of at least one of said first type of guide passage.

In exemplary embodiments, the dryer comprises a plurality of said second type of guide passage. In exemplary embodiments, at least one of said second type of guide passage is defined between a pair of said plurality of discrete elements.

In exemplary embodiments, a plurality of said second type of guide passage is defined between a pair of said plurality of discrete elements, e.g. three or more, in order to increase the promotion of helical flow of gas-entrained particles in the drying chamber.

In exemplary embodiments, the plurality of discrete elements comprises a plurality of annular elements, each having a body defining a central aperture.

In exemplary embodiments, the annular elements are configured to cooperate in pairs, one annular element adjacent another. In exemplary embodiments, the central apertures from each pair define at least part of a bore of the drying chamber (i.e. at a location between the first and second ends of the drying chamber).

In exemplary embodiments, one or more pairs said plurality of annular elements, or each pair of said plurality of annular elements, defines at least one guide passage extending between first and second annular elements of said pair, and configured for directing gas under pressure from between said pair and into the bore of the drying chamber.

In exemplary embodiments, the dryer comprises a plurality of said first type of guide passage, and wherein at least one of said first type of guide passage is defined between a pair of said plurality of annular elements.

In exemplary embodiments, the dryer comprises a plurality of said second type of guide passage, and wherein at least one of said second type of guide passage is defined between a pair of said plurality of annular elements.

In exemplary embodiments, the drying chamber is arranged in fluid communication with a source of gas under pressure, via the guide passages between respective pairs of said annular elements.

In exemplary embodiments, the apparatus is configured for adjusting the spacing between the discrete elements in each pair of said plurality of discrete elements.

Adjusting the spacing can affect the process parameters of the supply of gas under pressure. Through testing, the optimal process parameters can be determined, e.g. in order to suit a desired configuration of dryer required for processing a given type (or level of surface moisture content) of particulate material. Such adjustability can therefore be used to improve the drying performance and efficiency of the apparatus.

In exemplary embodiments, each pair of said plurality of discrete elements is configured for cooperation with at least one spacer element, for setting a relative spacing or width of guide passage between the first and second discrete elements in each pair of said plurality of discrete elements.

Advantageously, the spacing can be easily adjusted by simply replacing the spacing element with a spacing element of different configuration (e.g. of a shorter or longer length).

In exemplary embodiments, the apparatus has multiple types of gas guide or guide passages for directing gas to interact with the flow of gas-entrained particulate material within the drying chamber, wherein each type of gas guide or guide passage is configured for creating a specific type or direction of gas flow into the flow path of particulate material travelling along the drying chamber.

In exemplary embodiments, the drying chamber defines a longitudinal axis, wherein a first type of gas guide or guide passage is of a type configured to direct a blade or shaft of gas into the drying chamber for the purpose of intersecting the flow of material travelling through the drying chamber, and a second type of gas guide or guide passage is of a type configured to direct gas into the drying chamber in a direction intended to travel about the longitudinal axis within the drying chamber, in order to create a spinning effect, wherein the first type of gas guide is different to the second type of gas guide.

In exemplary embodiments, the first type of gas guide or guide passage and/or the second type of gas guide or guide passage is configured for directing a flow of gas into the drying chamber in a plane perpendicular to the direction of flow of material within the drying chamber, or in a direction at an angle to the perpendicular (e.g. in a generally rearward direction or in a generally forward direction).

In exemplary embodiments, the drying chamber has a first end and an second end, and the apparatus is configured to create a helical flow of particulate material passing along the drying chamber between said first end and said second end in a first rotational direction (e.g. clockwise). In exemplary embodiments, the drying chamber further includes one or more gas guides or guide passages for directing gas under pressure into the drying chamber for interacting with a flow of gas-entrained particulate material within the drying chamber, wherein said one or more gas guides or guide passages is configured to direct gas in a generally tangential or rotational manner, in a second rotational direction which is counter to said first rotational direction (e.g. anti-clockwise), in order to create a reverse spin effect within the flow of gas-entrained particulate material.

In exemplary embodiments, the gas is directed under pressure into the drying chamber from a body of modular construction.

According to another aspect of the invention, there is provided an apparatus for removing moisture from particulate material, the apparatus comprising a dryer having a drying chamber for directing a flow of gas-entrained particulate material between first and second ends of the drying chamber. The dryer is configured for directing gas under pressure into the drying chamber, for interacting with a flow of gas-entrained particulate material within the drying chamber. The dryer comprises a body, which defines a plurality of guide passages arranged for fluid communication between the drying chamber and a source of gas under pressure. The configuration of the guide passages is adjustable.

For example, the size of at least one of said guide passages may be adjusted, such as by increasing or decreasing the width of the guide passage. Such adjustability can be used to influence the performance parameters of the gas which flows into the drying chamber via the guide passages. As such, the configuration of the dryer body can be adjusted, to optimise the drying efficiency of the dryer for any given type of particulate material to be processed (or level of surface moisture content to be processed for a given type of particulate material).

Each of said plurality of guide passages may be defined between a pair of elements arranged in series, one adjacent another. The elements may be configured to cooperate in pairs, one element adjacent another, so that a surface from each element in the pair defines at least part of a wall of the drying chamber (i.e. at a location between the first and second ends of the drying chamber).

In exemplary embodiments, each pair of said elements defines at least one guide passage extending between first and second elements of said pair, and configured for directing gas under pressure from between said pair and into the drying chamber.

In exemplary embodiments, the drying chamber is arranged radially outboard of the dryer body. For example, the dryer may comprise a housing with said dryer body located within the housing, and with the drying chamber defining an annulus around the dryer body, e.g. between a radially outer surface of the dryer body and an internal surface of the housing. In such embodiments, the guide passages will be arranged for directing a flow of gas under pressure in a radially outward direction, into said drying chamber.

In exemplary embodiments, the dryer comprises a first type of guide passage in fluid communication with said drying chamber, wherein said first type of guide passage is configured for directing gas under pressure in a radial direction with respect to a longitudinal axis of the drying chamber, or in a radial direction with respect to a general direction of flow of gas-entrained particulate material between said first and second ends of the drying chamber. Such a configuration can be used to create a radial 'blade' of gas in use. Advantageously, this 'blade' may substantially uninterrupted (i.e. without any gaps in the flow of gas as travels into the drying chamber). As such, the risk that some gas-entrained particulate material will not be intersected by the gas under pressure as it passes along the drying chamber is minimised. Consequently, the efficiency of the apparatus can be increased.

In exemplary embodiments, the dryer comprises a plurality of said first type of guide passage, and wherein at least one of said first type of guide passage is defined between a pair of elements.

In exemplary embodiments, the dryer comprises a second type of guide passage in fluid communication with said drying chamber, wherein said second type of guide passage is configured for directing gas under pressure in a tangential direction with respect to a longitudinal axis of the drying chamber, or in a tangential direction with respect to a general direction of flow of gas-entrained particulate material between said first and second ends of the drying chamber. The second type of guide element can be used to provide centrifugal force required to encourage gas-entrained particulate material to continue a helical flow path between said first and second ends of the drying chamber after being acted upon by the first type of guide passage, for example. As such, it may be preferable to configure the elements of the dryer in an array, wherein one or more of said second type of guide passage is arranged in series downstream of at least one of said first type of guide passage.

In exemplary embodiments, the dryer comprises a plurality of said second type of guide passage, and wherein at least one of said second type of guide passage is defined between a pair of elements.

In exemplary embodiments, the elements comprise a plurality of annular elements, each having a body defining a central aperture.

In exemplary embodiments, the annular elements are configured to cooperate in pairs, one annular element adjacent another, so that the central apertures from each pair define at least part of a bore of the drying chamber (i.e. at a location between the first and second ends of the drying chamber).

In exemplary embodiments, each pair of said plurality of annular elements defines at least one guide passage extending between first and second annular elements of said pair, and configured for directing gas under pressure from between said pair and into the bore of the drying chamber.

In exemplary embodiments, the dryer comprises a plurality of said first type of guide passage, and wherein at least one of said first type of guide passage is defined between a pair of said plurality of annular elements.

In exemplary embodiments, the dryer comprises a plurality of said second type of guide passage, and wherein at least one of said second type of guide passage is defined between a pair of said plurality of annular elements.

In exemplary embodiments, the drying chamber is arranged in fluid communication with a source of gas under pressure, via the guide passages between respective pairs of said annular elements.

In exemplary embodiments, each pair of elements is configured for cooperation with at least one spacer element, for setting a relative spacing or width of guide passage between the first and second discrete elements in each pair of said plurality of discrete elements.

Advantageously, the spacing can be easily adjusted by simply replacing the spacing element with a spacing element of different configuration (e.g. of a shorter or longer length).

According to a further aspect of the invention, there is provided an apparatus for removing moisture from particulate material, the apparatus comprising a dryer having a drying chamber for directing a flow of gas-entrained particulate material between first and second ends of the drying chamber. The dryer is configured for directing gas under pressure into the drying chamber, for interacting with a flow of gas-entrained particulate material within the drying chamber. The dryer comprises a body, which defines a plurality of guide passages arranged for fluid communication between the drying chamber and a source of gas under pressure. The dryer comprises a first type of guide passage in fluid communication with said drying chamber, wherein said first type of guide passage is configured for directing gas under pressure in a radial direction with respect to a longitudinal axis of the drying chamber, or in a radial direction with respect to a general direction of flow of gas-entrained particulate material between said first and second ends of the drying chamber. The dryer comprises a second type of guide passage in fluid communication with said drying chamber, wherein said second type of guide passage is configured for directing gas under pressure in a tangential direction with respect to a longitudinal axis of the drying chamber, or in a tangential direction with respect to a general direction of flow of gas-entrained particulate material between said first and second ends of the drying chamber.

In exemplary embodiments, the dryer is configured so that one or more of said second type of guide passage is arranged in series downstream of at least one of said first type of guide passage, between the first and second ends of the drying chamber. For example, the dryer may define a series of said guide passages, wherein one or more of said first type of guide passage is immediately followed by one or more of said second type of guide passage, along the direction of flow of said gas-entrained particulate material between the first and second ends of the drying chamber. The purpose of such a configuration is to encourage the gas-entrained particulate material to follow a helical flow path after intersection of the gas-entrained particulate material by gas from said first type of guide passage. Additionally or alternatively, one or more of said second type of guide passage may precede one or more of said first type of guide passage in the series, for the purpose of inducing or encouraging the gas-entrained particulate material to follow a helical flow path prior to intersection of the gas-entrained particulate material by gas from said first type of guide passage.

In exemplary embodiments, the configuration of at least one type of said first and second types of guide passage is adjustable. For example, the size of the guide passage may be adjusted, such as by increasing or decreasing the width of the guide passage. Such adjustability can be used to influence the performance parameters of the gas which flows into the drying chamber via the guide passages. As such, the configuration of the dryer body can be adjusted, to optimise the drying efficiency of the dryer for any given type of particulate material to be processed (or level of surface moisture content to be processed for a given type of particulate material).

Each guide passage may be defined between a pair of elements arranged in series, one adjacent another. The elements may be configured to cooperate in pairs, one element adjacent another, so that a surface from each element in the pair defines at least part of a wall of the drying chamber (i.e. at a location between the first and second ends of the drying chamber).

In exemplary embodiments, each pair of said elements defines at least one guide passage extending between first and second elements of said pair, and configured for directing gas under pressure from between said pair and into the drying chamber.

In exemplary embodiments, the drying chamber is arranged radially outboard of the dryer body. For example, the dryer may comprise a housing with said dryer body located within the housing, and with the drying chamber defining an annulus around the dryer body, e.g. between a radially outer surface of the dryer body and an internal surface of the housing.

In such embodiments, the guide passages will be arranged for directing a flow of gas under pressure in a radially outward direction, into said drying chamber.

In exemplary embodiments, the elements comprise a plurality of annular elements, each having a body defining a central aperture.

In exemplary embodiments, the annular elements are configured to cooperate in pairs, one annular element adjacent another, so that the central apertures from each pair define at least part of a bore of the drying chamber (i.e. at a location between the first and second ends of the drying chamber).

In exemplary embodiments, each pair of said plurality of annular elements defines at least one guide passage extending between first and second annular elements of said pair, and configured for directing gas under pressure from between said pair and into the bore of the drying chamber.

In exemplary embodiments, the drying chamber is arranged in fluid communication with a source of gas under pressure, via the guide passages between respective pairs of said annular elements.

In exemplary embodiments, each pair of elements is configured for cooperation with at least one spacer element, for setting a relative spacing or width of guide passage between the first and second elements in each pair.

Advantageously, the spacing can be easily adjusted by simply replacing the spacing element with a spacing element of different configuration (e.g. of a shorter or longer length).

BRIEF DESCRIPTION OF THE DRAWINGS

Embodiments of the invention will now be described with reference to the accompanying drawings, in which.

DETAILED DESCRIPTION OF EMBODIMENT(S)

An apparatus for removing moisture from particulate material will now be described. In general terms (which will be expanded on below), such apparatus has an inlet for introducing gas-entrained particulate material into the apparatus, and an outlet for collecting the gas-entrained particulate material from the apparatus. The intention of the apparatus is to 'process' the particulate material in such a way that the material leaves the apparatus in a state with less surface moisture than when the material first entered the apparatus. To that end, the apparatus defines a flow path for the gas-entrained particulate material to travel along, between the inlet and the outlet. Moreover, the apparatus is configured for directing gas under pressure (e.g. compressed air) into the flow path, in such a way as to intersect the particulate material, with the intention of removing moisture from the surface of the particulate material as it passes along the flow path.

Figure 1:
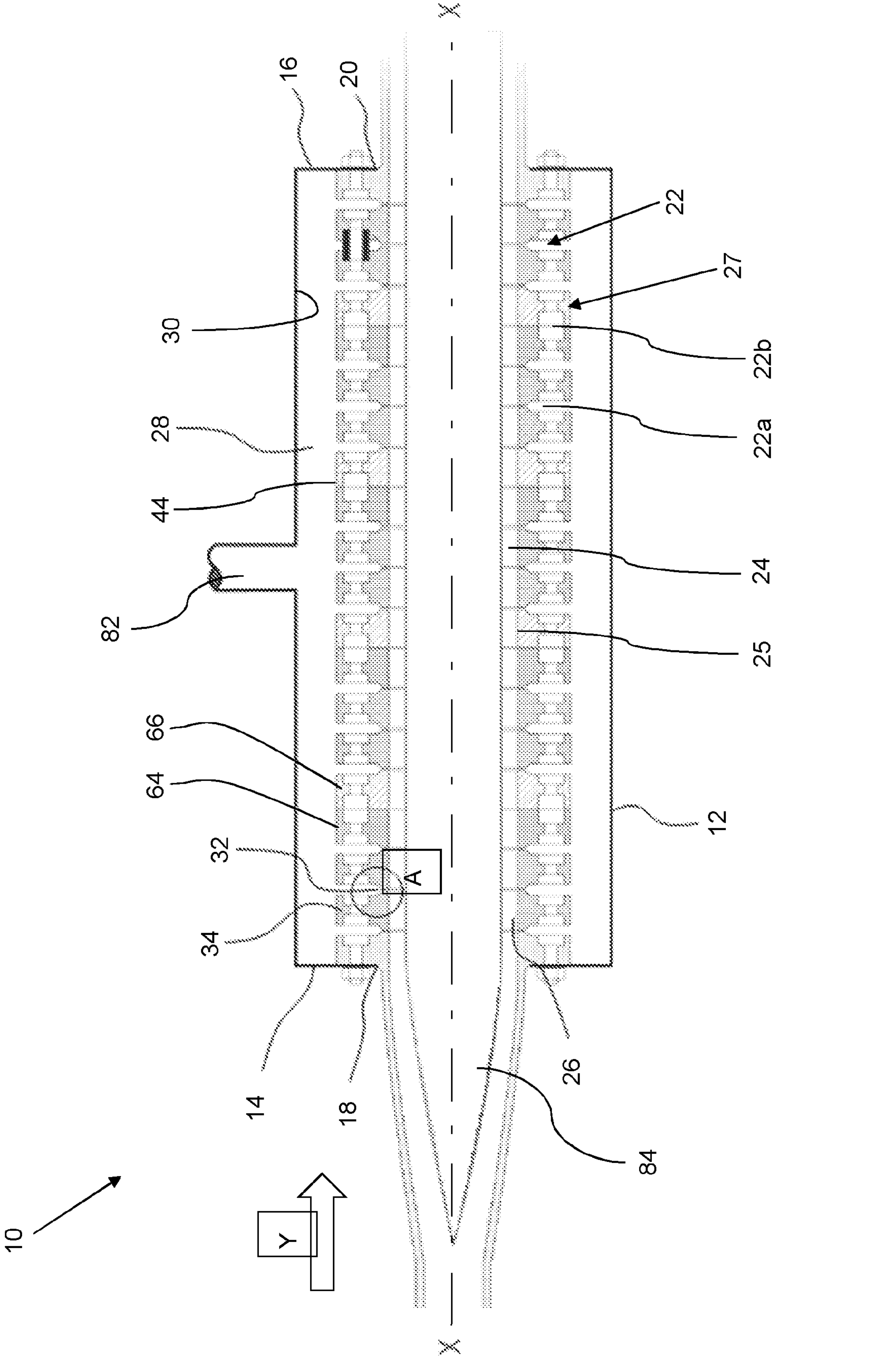
FIG. 1 is a longitudinal cross-sectional view through an apparatus for removing surface moisture from particulate material.

Looking now at FIG. 1, an apparatus for removing moisture from particulate material is indicated generally at 10. The apparatus 10 has a dryer housing 12 with a first end 14 and a second end 16. The housing 12 defines a longitudinal axis X-X. In this embodiment, the housing 12 is in the form of an elongate cylinder, concentric with the longitudinal axis X-X. The first and second ends 14, 16 are located generally opposite each other along the longitudinal axis X-X, although other configurations are possible.

An input opening 18 is provided at the first end 14, for introducing gas-entrained particulate material into the housing 12. An output opening 20 is provided at the second end 16, for collecting gas-entrained material from the housing 12.

The housing 12 defines a flow path for the gas-entrained particulate material, extending between the input opening 18 and the output opening 20 (generally along the longitudinal axis X-X and in the direction of the arrow Y).

In this embodiment, the flow path for the gas-entrained particulate material extends along a drying chamber, in the form of a channel 26 defined within the housing 12.

The apparatus 10 is configured for directing a plurality of discrete flows or jets of gas under pressure, in series, into the flow path, for the purpose of intersecting the gas-entrained particulate material.

In the illustrated embodiment, the channel 26 is defined by a bore 24 extending through a body 27 having a plurality of guide passages 22, arranged in series, and configured for directing gas into the flow path.

In this embodiment, the channel 26 is concentric with the longitudinal axis X-X of the housing 12, and the guide passages 22 are configured for directing gas through a side wall 25 of the bore 24, into the flow path. Since the flow path extends within the channel 26, along the longitudinal axis X-X of the housing 12, it will be understood that the gas is directed from the body 27 in a generally radially inward direction with respect to the longitudinal axis X-X, in this embodiment.

The apparatus 10 may have multiple types of guide passages 22, each type of gas guide passage being configured for creating a specific type or direction of gas flow into the flow path (e.g. with the intention of achieving a different result within the flow path).

For the illustrated embodiment, the apparatus 10 includes a first type of gas guide **22*a* and a second type of gas guide 22*b*. The differences between the first and second types of gas guide 22*a*, 22*b* will be described in more detail below. However, at a general level, the first type of guide 22*a* is arranged to direct gas in an at least substantially radial direction with respect to the general direction of flow of the gas-entrained particles, whereas the second type of guide 22*b* is arranged to direct gas in a direction at least substantially tangential, or in a rotational sense, with respect to the general direction of flow of the gas-entrained particles. The first type of gas guide therefore acts in a direction perpendicular to the flow, which serves to displace or strip moisture from the surface of the particulate material within the flow path, whereas the second type of gas guide 22*b* helps to cause the flow of particulate material to 'spin' (e.g. in a circumferential direction within the channel 12) along the flow path, so that the material passes along the channel 26** in a generally helical manner.

In exemplary embodiments, the first and second gas guides **22*a*, 22*b* are arranged generally in series, typically with at least one of said second gas guide 22*b* located between two of said first gas guides 22*a* in the series. However, as will be described below, in exemplary embodiments, the body 27 is of modular construction, allowing for different or adjustable arrangements of the first and second gas guides 22*a*, 22*b***.

It should be noted that gas for the gas guides **22*a*, 22*b* is typically supplied from a remote source, e.g. a source of compressed air. In the illustrated embodiment, the housing 12 defines a plenary chamber 28 around the body of the channel 26, wherein gas is supplied to the chamber 28, via a gas inlet 82, and transfers from the chamber 28 to the flow path under pressure, via the gas guides 22*a*, 22*b*. Alternatively, each gas guide 22*a*, 22*b* (or sets of gas guides 22*a*, 22*b*) may be provided with a discrete source of gas under pressure. In exemplary embodiments, the drying channel 26 is isolated from the plenary chamber 28 or any other source of gas under pressure (of the kind intended for intersection with the flow path), other than via the guide passages 22*a*, 22*b***.

The body 27 of the drying channel 26 in the illustrated embodiment is of modular construction, including discrete annular elements, which cooperate with one another to define the gas guides **22*a*, 22*b*. Each annular element has a through bore 24. The annular elements are arranged together with the bores 24 aligned, e.g. so that the bore 24 of each annular element is concentric with the longitudinal axis X-X of the housing 12. In exemplary embodiments, the channel 26 is configured from a series of said annular elements, arranged one adjacent another, so that the side wall of the channel 26 is defined by the bore wall 25** of each of the annular elements together, for constraining the flow path of the gas-entrained particulate material.

As can be seen, the plenary chamber 28 is defined between a radially outer surface 44 of the annular elements (described in more detail below) and an inner surface 30 of the housing 12. In this embodiment, therefore, the plenary chamber 28 is of generally annular configuration, concentrically located, radially outward of the annular elements, with respect to the channel 26. In this embodiment, the chamber 28 extends in a direction parallel with the longitudinal axis X-X of the housing 12.

At a general level, it can be said that each gas guide **22*a*, 22*b* takes the form of at least one passage 32 for directing gas from the gas source into the channel 26. It will be appreciated that such passages 32 could be made, for example, by boring a hole through a solid annular element during manufacture. In the illustrated embodiment, however, each gas guide 22*a*, 22*b* may be created between opposing parts (e.g. first and second annular elements of the kind referred to above), whereby the passage 32 is defined when the opposing parts are brought together (i.e. with the shape of the passage 32 dictated by the respective profile of the opposing parts). An example of this can be seen in FIG. 1, but is most clearly visible—by way of example—in the enlarged view of FIG. 2, where the passage 32 is defined between first and second annular elements 34, 36**.

Figure 2:
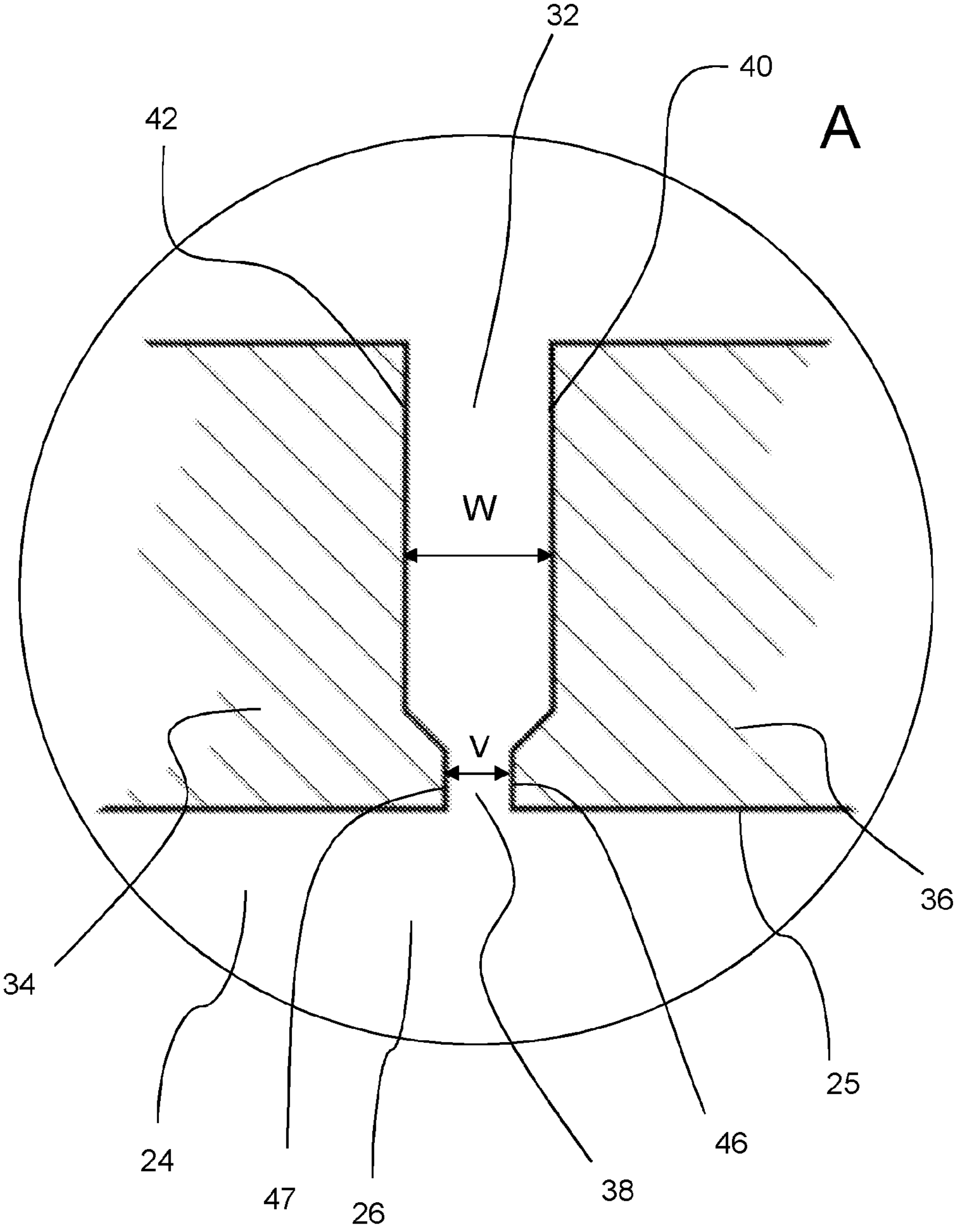
FIG. 2 is an enlarged detail view of part 'A' of FIG. 1, showing a gas guide located between first and second annular elements of the apparatus.

Referring in more detail to FIG. 2—which shows an example of a first type of gas guide 22*a*—it can be seen that the passage 32 extends radially and is defined between the first and second annular elements 34, 36. The width w of the passage 32 is uniform along a substantial part of the length of the passage 32 (i.e. extending between the radial outer surface 44 and bore wall 25. However, the passage 32 of the first gas guide 22*a* has a narrowed mouth portion 38 adjacent the bore 24, where the width is reduced (as indicated in FIG. 2 with the dimension v). The restricted cross-section of the mouth portion 38 is intended to create a jet of gas, by causing the velocity of gas to increase as it passing through the passage 32 to the channel 26 when the apparatus is in use. In general terms, it will be understood that the first type of gas guide 22*a* is therefore used to create a substantially radial blade of gas entering the channel 26, when the apparatus is in use.

An example of a first annular element for use in the apparatus 10 will now be discussed in detail, with reference to FIGS. 3 to 5.

Figure 3:
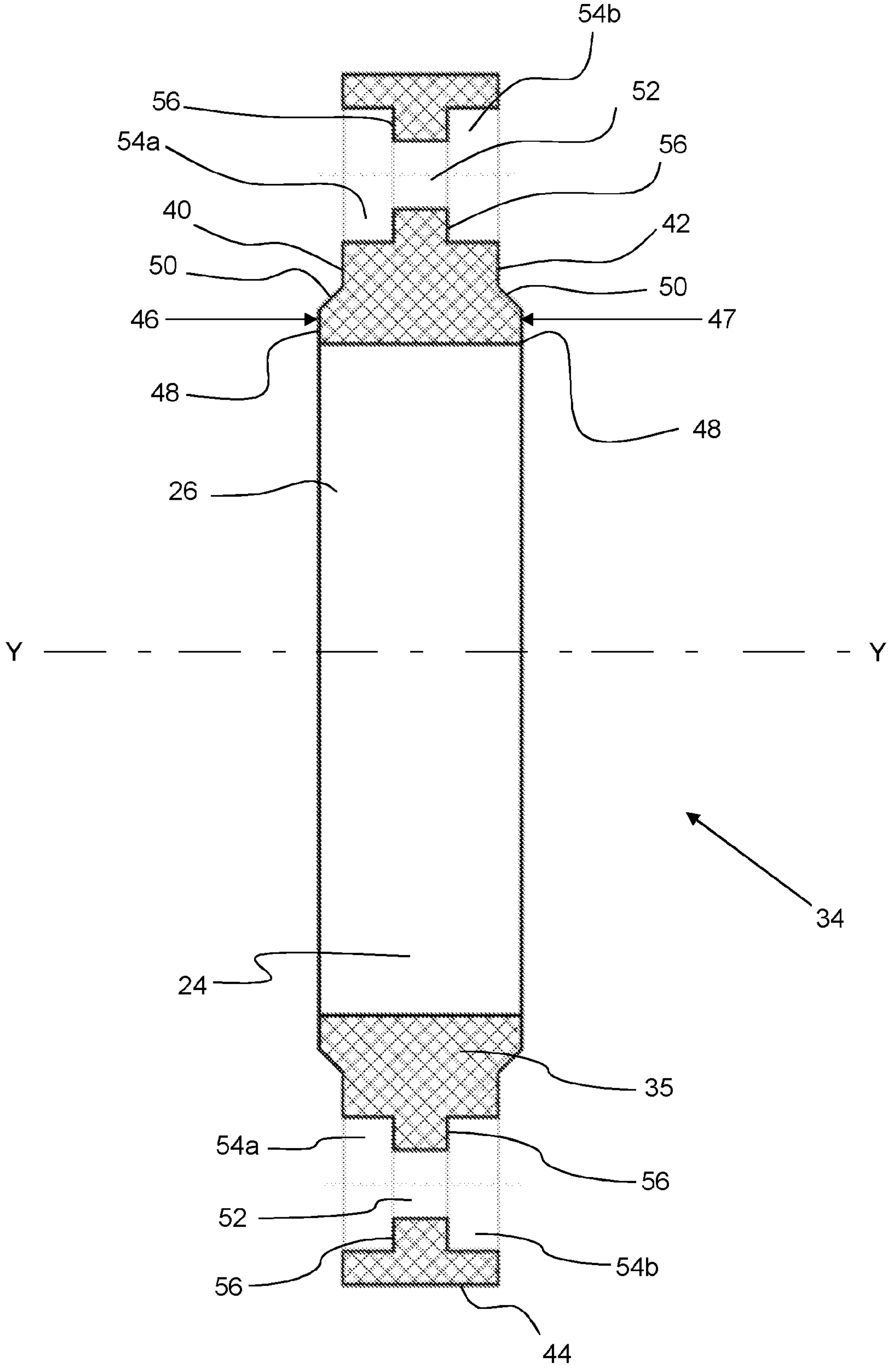
FIG. 3 is a cross-sectional view of a first configuration of annular element for use in the apparatus of FIG. 1.

Referring firstly to FIG. 3, annular element 34 has a body 35 with a front face 40 and a back face 42. A circumferential radially outer surface 44 extends between the front and back faces 40, 42. The bore 24 is generally circular, and passes through the body 35 of the annular element 34, i.e. from the front face 40 to the back face 42. The annular element 34 has a projecting peripheral land portion 46, defined around the perimeter of the bore 24, extending from the front face 40. The annular element 34 also has a projecting peripheral land portion 47, defined around the perimeter of the bore 24, extending from the back face 42. Each land portion projects in a direction parallel to a central axis Y-Y of the body. Each land portion 46, 47 is made up of a flat portion 48 and an angled portion 50, the angled portion 50 extending between the flat portion 48 and the respective front or back face 40, 42.

It will be understood that a pair of said annular elements 34 may be brought together (e.g. in the manner of the first and second parts 34, 36 of FIG. 2), so that the back face 42 of one of the pair and a front face of the other of the pair can together be used to define the passage 32 of the first type of gas guide 22*a*, with the two elements 34 held parallel yet spaced from one another, such that the opposing land portions 46, 47 of the first and second parts together define the mouth portion 38 of the passage 32. Moreover, it will be understood that the mouth portion 38 defines a continuous slot (e.g. extending through 360 degrees) within the side wall 25 of the channel 26. This slot defines a blade of gas exiting the channel body 27, into the flow path, so as to intersect the flow of gas-entrained particulate material. Advantageously, this 'blade' has substantially no breaks in the gas flow from the channel body 27, which minimises the risk that some particulate material might avoid intersection by the gas (e.g. compressed air) in use (described in more detail below).

In other embodiments, the slot is non-continuous outlet (i.e. extending less than 360 degrees), so as to define a discrete shaft of gas emitting into the drying chamber, in use. For such embodiments, a plurality of said slots may be provided, spaced from one another (e.g. in a circumferential array), so as to define a plurality of discrete shafts of gas emitting into the drying chamber. Each slot may be in communication with the same passage 32, or may be associated with a dedicated passage 32 (i.e. where the number of slots corresponds to the number of passages formed between the pair of adjacent elements 34.

The land portions 46, 47 are adjacent the bore 24 in this embodiment, as the gas (e.g. compressed air) is intended to be directed in a radially inward direction with respect to the longitudinal axis X-X of the housing 12. In other embodiments, the flow path for the gas-entrained particulate material may be radially outboard of the annular elements (e.g. within a chamber similar to the plenary chamber 28, for example), in which case the profile of the annular elements will be different, such that the mouth portion 38 is arranged adjacent the outer surfaces 44 of the annular elements (so the gas can be directed in a radially outward direction into a flow path of gas-entrained particulate material within the annular chamber 28, e.g. from a pressurised source in communication with the channel 26).

Figure 4:
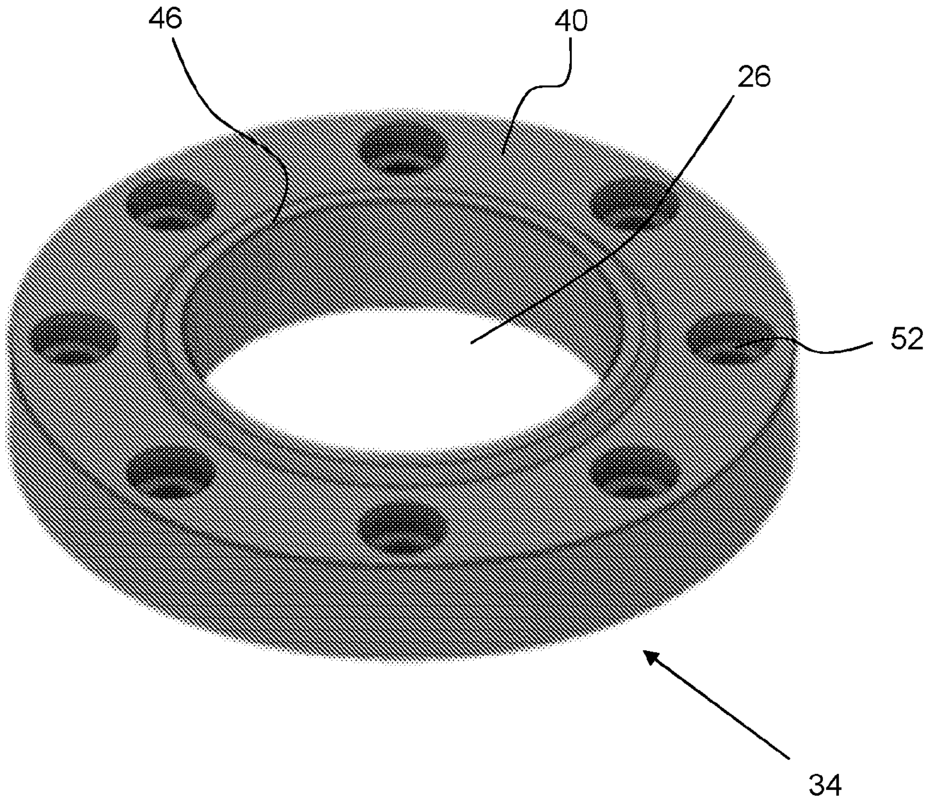
FIG. 4 is a perspective view from one side of the annular element of FIG. 3.
Figure 5:
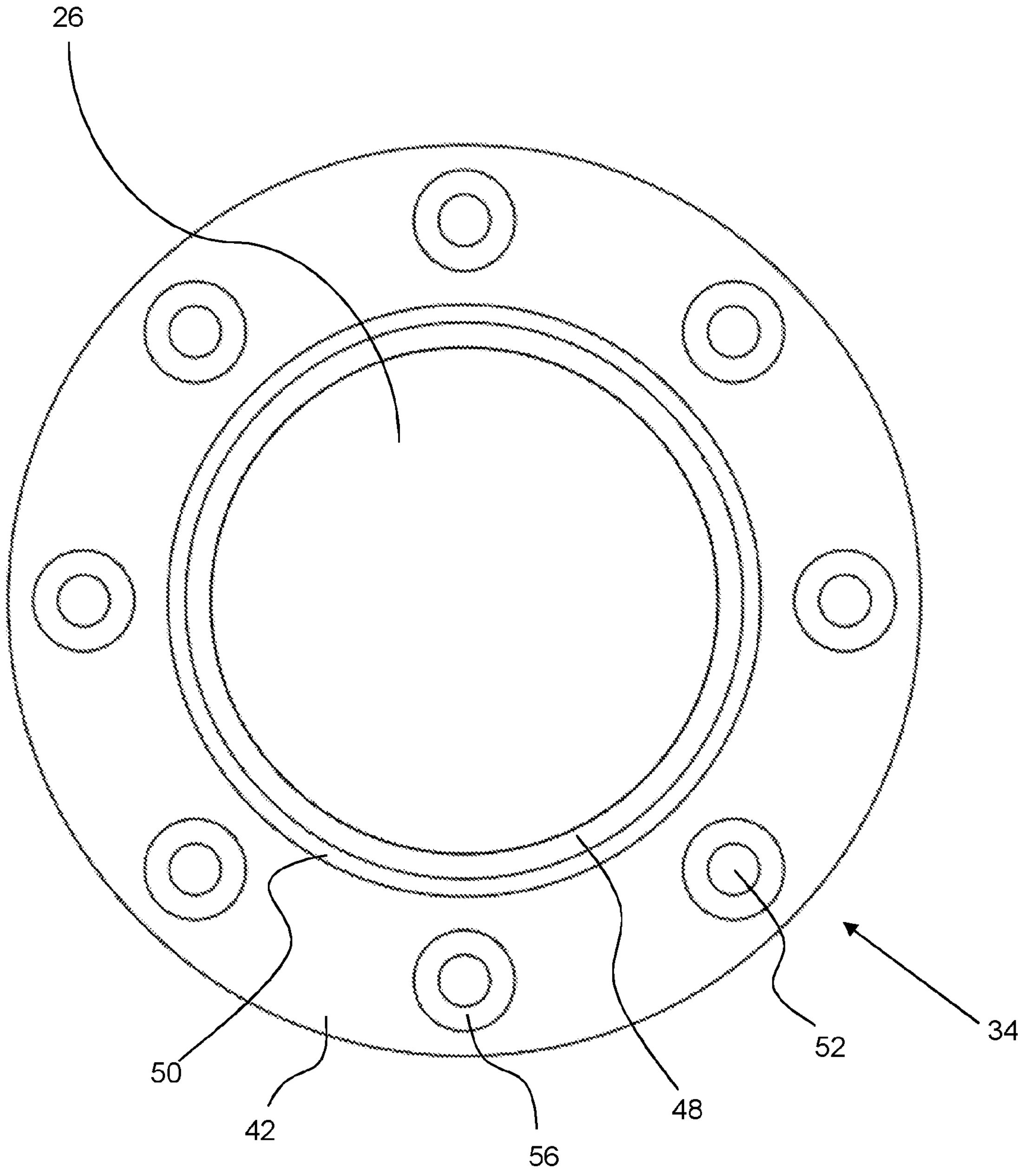
FIG. 5 is a front view of the annular element of FIGS. 3 and 4.

As can be seen from each of FIGS. 3 to 5, in this embodiment, a plurality of apertures 52 is distributed circumferentially around the annular element 34, extending from the front face 40 to the back face 42 (e.g. in a direction parallel to the central axis of the bore 24).

In each face 40, 42 of the annular element 34, each aperture 52 is surrounded by a depression 54. The detail of the depressions 54 can be seen most clearly from FIG. 3; a front depression 54*a* is provided in the front face 40, and a rear depression 54*b* is provided in the back face 42. Each depression 54*a*, 54*b* defines a generally planar surface or shoulder 56 (extending parallel with the front and back faces 40, 42) peripheral to each aperture 52.

Figure 6:
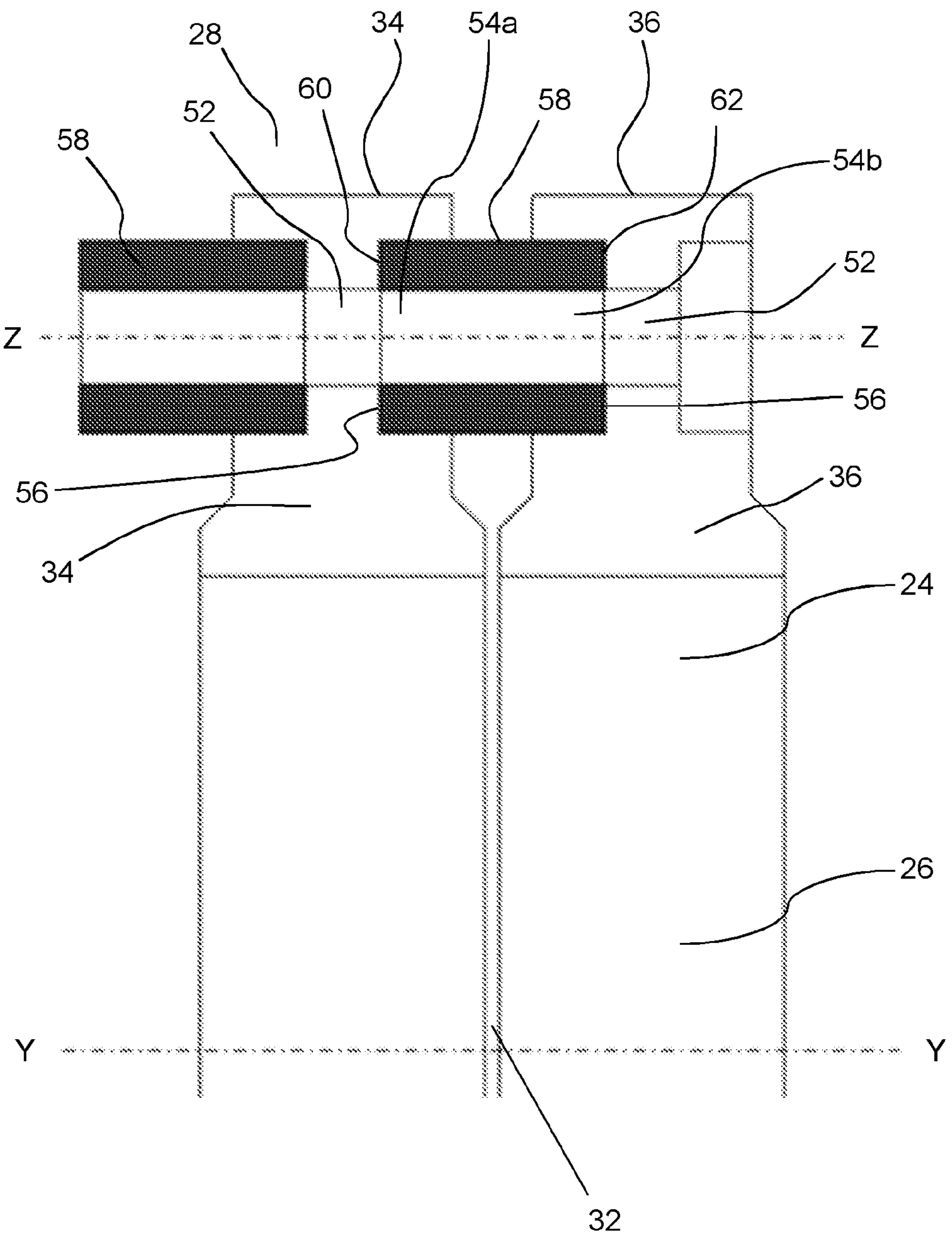
FIG. 6 is a cross-sectional view of the first and second annular elements of the kind shown in FIGS. 3 to 5, arranged in a spaced apart manner, to define a gas guide of the apparatus.

The general function of this configuration is illustrated in FIG. 6, which shows a pair of said annular elements 34 in series, with the bores 24 and apertures 52 aligned on common axes Y-Y and Z-Z, respectively. This arrangement defines a cylindrical cavity extending between the opposing depressions 54*a*, 54*b*.

A spacer 58 is located between the pair of annular elements, with one end of the spacer 58 located in depression 54*a* and the other end of the spacer located in depression 54*b*. This arrangement serves to maintain a desired spacing between the pair of annular elements 34 (e.g. of width w along the passage 32 and width v at the mouth portion 38). Moreover, the location of the spacer 58 does not significantly affect the flow of gas along the passage 32 between the chamber 28 and the channel 26.

The dimensions of the spacer 58 can be adjusted, in order to alter the spacing between discrete pairs of the first annular elements 34 (e.g. to increase or decrease the spacing and, hence, the width of the blade of gas that emits from the first type of guide element 22*a*. Indeed, by using multiple sizes of spacer for any given series, it is possible to vary the drying performance of the apparatus 10 for any given material. This results in a readily adaptable apparatus that can lead to improvements in drying efficiency for different types of particulate materials and/or for different levels of surface moisture content that might be experienced between different batches of any one type of particulate material. The width of the passage 32 (and the dimensions/profile of the mouth portion 38) determines the amount/level of compressed air that will intersect the gas-entrained particulate material at that point along the longitudinal axis of the channel as it passes through the apparatus. Through testing, the preferred parameters for the gas guide 22*a* for each type of material or grade of surface moisture content can be determined, and the width/profile of the passages adjusted accordingly, to optimise drying performance and efficiency of the apparatus.

In the illustrated embodiment, the spacer 58 is tubular and of circular cross-section, though it will be appreciated that other configurations of spacer could be used; with the primary objective to maintain a desired spacing between the annular elements 34, without unduly affecting the flow of gas through the guide element 22*a*. It will be understood that the spacers 58 are discrete members distributed circumferentially around the guide element 22*a*, such that the passage 32 still defines a substantially continuous slot, for the passage of gas (e.g. compressed air) in use.

The illustrated arrangement has been found suitable for maintaining the pair of annular elements 34 together in series in a generally parallel orientation and spacing. However, it will be understood that other arrangements for spacing a pair of said annular elements 34 is possible, e.g. using a plurality of discrete spacers extending between the two annular elements 34 in a configuration which does not significantly impede a flow gas along the passage 32 and into the flow path of gas-entrained particulates.

An example of a second configuration of annular element 64 for use in the apparatus 10 will now be discussed in detail, with reference to FIGS. 7 to 9.

Figure 7:
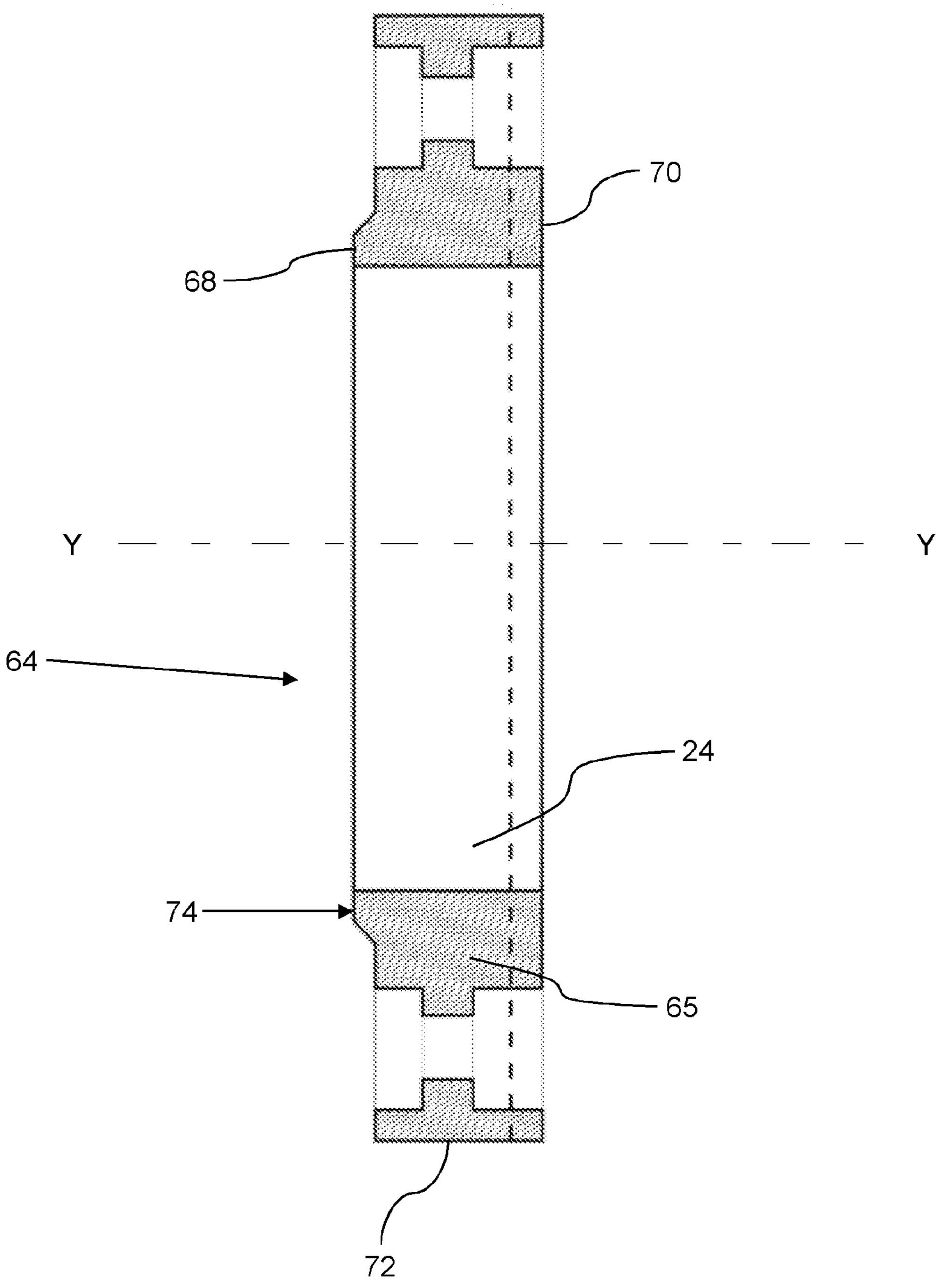
FIG. 7 is a cross-sectional view of a second configuration of annular element for use in the apparatus of FIG. 1.

Referring firstly to FIG. 7, the annular element 64 has a body 65, with a front face 68, a back face 70, and a circumferential radially outer surface 72 extending between the front and back faces 68, 70. The bore 24 is generally circular. The bore 24 corresponds to the bore 24 of the first annular element 34. The annular element 64 has a projecting peripheral land portion 74 defined around the perimeter of the bore 24, but in this case only projecting from the front face 68. There is no peripheral land portion projecting from the back face 70. The configuration of the land portion 74 is as described above for the land portions 46, 47.

It should be noted that the front face 68 of the second annular element 64 is configured so that it may be arranged in series with—and spaced apart from—the back face 42 of the first annular element 34, to define a gas guide 22*a* of the first type described herein; the opposing land portions 46, 74 together define the mouth portion 38 of the passage 32, e.g. for directing a radial blade of gas into the flow path of the gas-entrained particulates.

The back face 70 of the second annular element 64 is configured for creating an alternative configuration of passage 32, specifically to create the second type of gas guide 22*b*. In particular, the back face 70 of the second annular element 64 has a number of circumferentially distributed 'recesses' or 'cut-out portions' 76. As can be seen most clearly from FIGS. 8 and 9, in this embodiment, each cut-out portion 76 has a generally triangular or tapered profile, in plan view, defining a narrow mouth at the bore 24, and widening in a generally radial direction to the outer surface 72. Each cut-out portion 76 defines a planar base wall 78, which extends is parallel with the plane of the back face 70. Each cut-out portion 76 also defines opposing side walls 80, which extend at an angle to a direction that is perpendicular to the perimeter of the bore 24. More specifically, each cut-out portion 76 has a central axis t, which is arranged to be generally tangential to the perimeter of the bore 24 (seen most clearly in FIG. 9). In use, if the annular element 64 is arranged with the back face 70 arranged against a similar annular element having a plane front face (or another type of annular element having a corresponding recessed/cut-put configuration in the front face thereof), this configuration of annular element 64 can be used to create the second form of gas guide 22*b* described herein, i.e. configured for directing gas in a direction tangential with respect to the flow path within the channel 26. This can induce rotation within the gas-entrained particulate flow, and thereby cause the material to follow a helical pattern as it passes through the channel 26.

If it is desired to direct gas in a radially outward direction (e.g. if the gas-entrained flow is within the plenary chamber 28, rather than in the channel 26), the direction of taper of the recesses/cut-out portion can be reversed, so that the mouth of the passage 32 is adjacent the radial outer surface of the annular element, rather than the bore 24.

It should be noted that this second configuration of annular element also includes a plurality of radially outboard apertures and depressions corresponding to those described with reference to the annular element 34 of FIGS. 3 to 6. In this embodiment, the apertures and depressions are located between the cut-out portions 76, as can be seen clearly from FIGS. 8 and 9. The apertures and depressions of the embodiment of FIGS. 7 to 9 are therefore not described again. However, it will be understood that spacers 58 can be used in the same manner as that described with reference to FIGS. 3 to 6, to define and adjust the parallel spacing between the annular element 64 and adjacent annular elements in the channel body 27.

Figure 10:
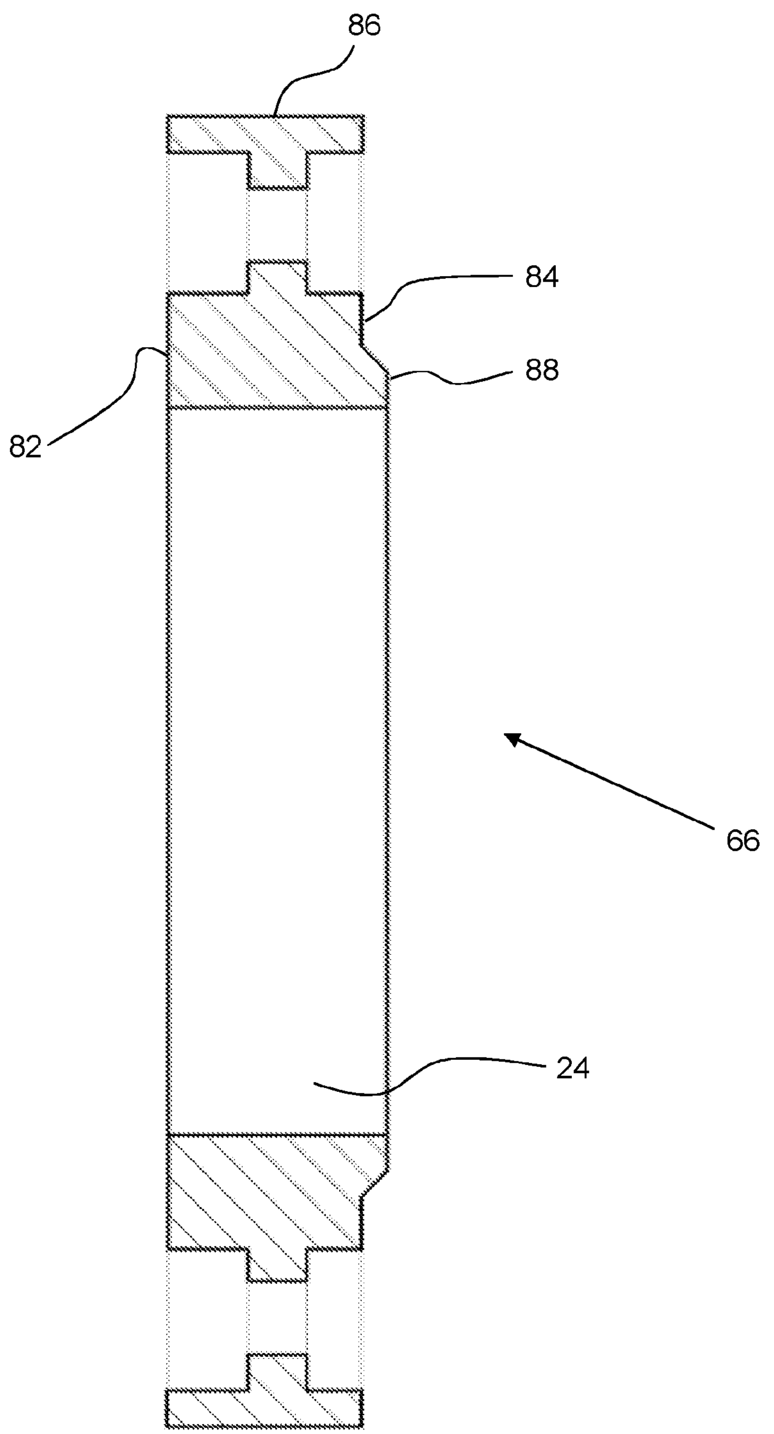
FIG. 10 is a cross-sectional view of a third configuration of annular element for use in the apparatus of FIG. 1.
Figure 11:
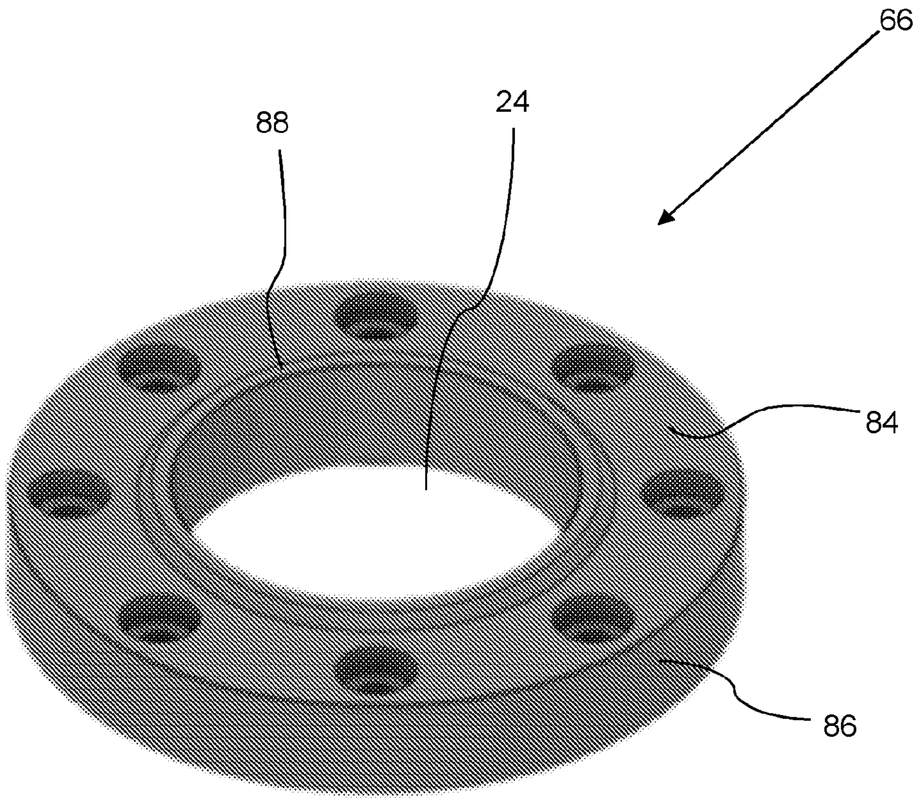
FIG. 11 is a perspective view from one side of the annular element of FIG. 10.
Figure 12:
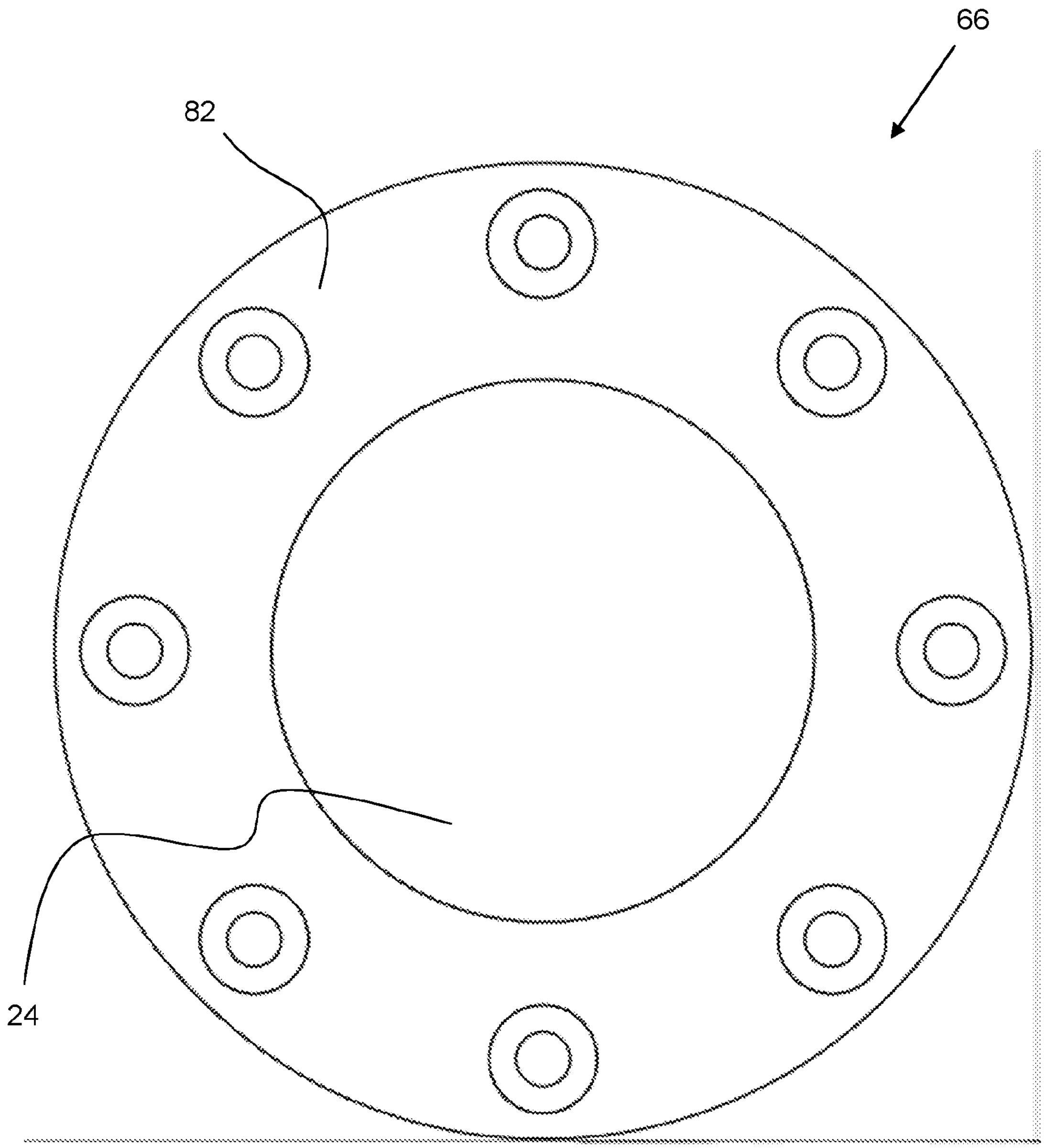
FIG. 12 is a front view of the annular element of FIGS. 10 and 11.

An example of a third configuration of annular element 66 for use in the apparatus 10 will now be discussed in detail, with reference to FIGS. 10 to 12. The third annular element 66 has a front face 82 and a back face 84, with a circumferential radially outer surface 86 extending therebetween. The bore 24 is generally circular. The bore 24 corresponds to the bore of the first and second annular elements 34 and 64. The annular element 66 has a projecting peripheral land portion 88 defined around the perimeter of the bore 24, but in this case only projecting from the back face 84. There is no peripheral land portion projecting from the front face 82; the front face 82 is substantially planar from the outer surface 86 to the perimeter of the bore 24.

Accordingly, the front face 82 of the third annular element 66 may be arranged adjacent the back face 70 of the second annular element 64, with the bores 24 aligned, in order to create angled passages 32, characteristic of the second type of gas guide 22*b* described herein.

Moreover, the back face 84 of the third annular element 66 can be arranged adjacent the front face of the first or second annular elements 34, 36, with the bores 24 aligned, to define a radial passage 32, characteristic of the first type of gas guide 22*a* described herein.

Figure 8:
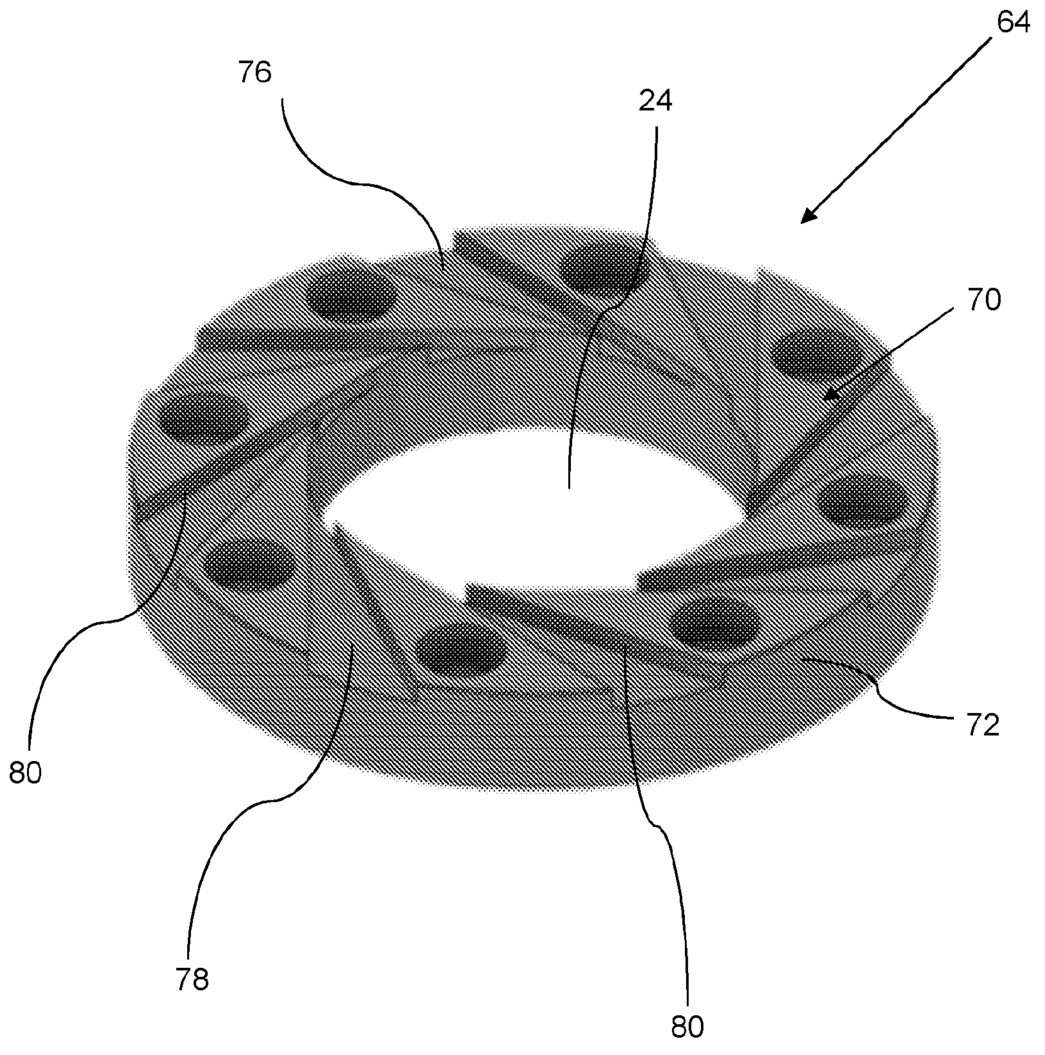
FIG. 8 is a perspective view from one side of the annular element of FIG. 7.
Figure 9:
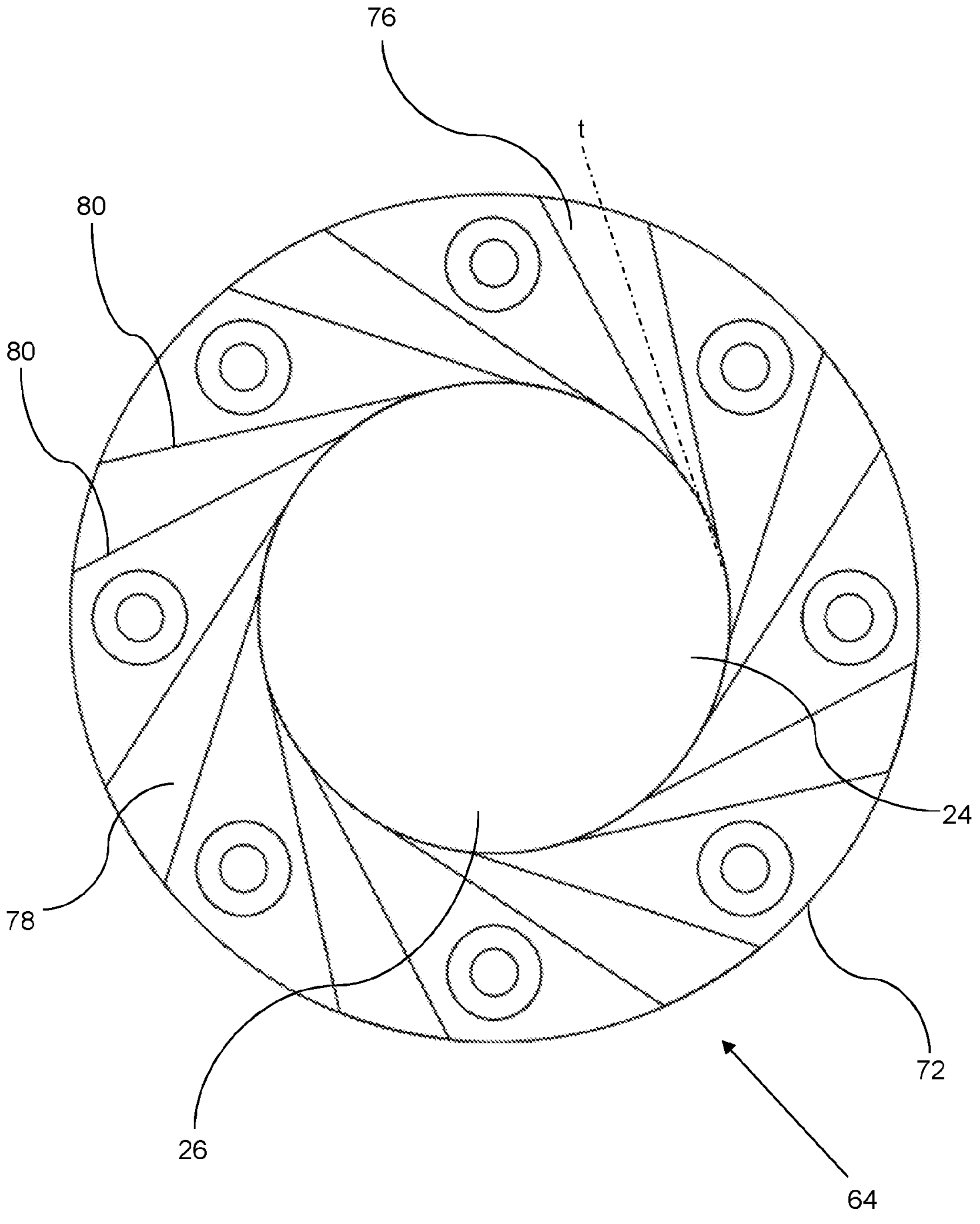
FIG. 9 is a front view of the annular element of FIGS. 7 and 8.

It should be noted that this third configuration of annular element also includes a plurality of radially outboard apertures and depressions corresponding to those described with reference to the annular element 34 of FIGS. 3 to 6, and as illustrated in the embodiment of FIGS. 7 to 9. The apertures and depressions of the embodiment of FIGS. 10 to 12 are therefore not described again. However, it will be understood that spacers 58 can be used in the same manner as that described with reference to FIGS. 3 to 6, to define and adjust the parallel spacing between the annular element 66 and adjacent annular elements in the channel body 27.

As with the first annular element 34, if it is desired to direct gas in a radially outward direction (e.g. if the gas-entrained flow is within the plenary chamber 28, rather than in the channel 26), the location of the mouth of the passage 32 can be swapped to be adjacent the radial outer surface of the annular element, rather than the bore 24.

From the above description, it should be apparent that the use of different types of annular element 34, 64, 66, in series, allows for a very adaptable configuration of apparatus, which can be readily adjusted for different drying requirements. The annular elements may be arranged in series along the length of the channel body 27, or may be arranged in discrete sets of annular elements, spaced from one another, along the length of the channel body 27. The radially outboard apertures for each type of annular element can be aligned, when the annular elements are arranged in series in a group. One or more securing elements, such as elongate rods or bolts, can be used to extend through the aligned apertures in the group of annular elements, for temporarily holding the annular elements together, with the appropriate spacers in position. To that end, it may be preferable for the spacers to be tubular, so that such securing elements may extend through the spacers.

Corresponding apertures may be provided in the housing 12, to receive the respective end of such a securing member, and ensure annular elements are arranged in the correct location within the housing 12. A simple securing mechanism, such as a nut and bolt arrangement, could be used to secure the securing members to the housing 12. This would enable simple assembly and disassembly of the modular system, enabling the arrangement, configuration and spacing of the respective annular elements to be varied as desired.

In exemplary embodiments, the plenary chamber 28 is isolated from the channel 26, except for via the fluid communication that is possible through the passages 32.

In the illustrated embodiment of FIG. 1, a core member 84 is located concentrically within the channel 26, extending along the longitudinal axis X-X. The core member 84 is a solid cylindrical member, which limits the space for the flow path defined within the channel, to help ensure that the particulate material remains close to the inner surfaces of the annular elements 34, 64, 66, and thereby increase the chance that the particulate material will be intersected by the gas exiting from the gas guides 22*a*, 22*b* in use.

In use, gas-entrained particulate material (not shown) is supplied to the input opening 18. The particulate material then passes along the channel 26 to the output opening 20, where it is evacuated.

In exemplary embodiments, an air compressor (not shown) is used to supply compressed air through the gas inlet 82 and into the plenary chamber 28 of the housing 12. The introduction of the compressed air causes a pressure differential between the chamber 28 and the channel 26, which forces the compressed air from the chamber 28 to the channel 26, via the passages 32. Therefore, compressed air is directed in a radially inward direction relative to the longitudinal axis X-X of the housing 12, to intersect the gas-entrained material. In this embodiment, the mouth portions 38 of the passages 36 cause the compressed air to speed up, to intersect the air-entrained material passing through the channel 26 at an increased velocity.

The exact configuration of the gas guides 22*a*, 22*b* can be varied as necessary, to achieve the target performance of the apparatus. Different configurations will suit different materials, and this can be easily achieved. For example, new guide elements can be added or guide elements can be removed. The width w of the passages 32 can be varied as desired. Moreover, the order and arrangement of the three types of annular element described herein can be varied, as desired, depending on what arrangement is found to provide optimal performance for a particular material or surface moisture level.

The annular elements 34, 64, 66 and the core member 84 can be manufactured from any appropriate material, but are typically made of steel or another suitably durable material.

In exemplary embodiments, the channel body 27 may be in the region of 1.0 m in length, and annular elements may have a bore typically in the region of 0.2 m in diameter. In such embodiments, the width w of the passage 32 might typically be in the region of 0.5 mm and 10 mm. Of course, other sizes of apparatus may be dimensioned as appropriate for the nature of the material to be dried.

Typically, the particulate material flow may be entrained in air and the gas for the gas guides will be compressed air. However, it will be appreciated that any suitable gas could be used for entrainment and flow intersection. For example, if the entrained particulate material is pyrophoric, then nitrogen gas would be most suitable.

The particle entrainment gas and the pressurised gas for the gas guides will typically operate at ambient temperature, though it may be slightly higher due to the heat caused by compression and processing within the apparatus etc. Additional heat can be beneficial, but it is not necessary to deliberately add heat energy to the entrainment gas passing through the apparatus; the apparatus is intended to operate under substantially ‘cold’ process conditions, i.e. without significant or substantial heat energy being added to the system. Movement of the gas-entrained particles through the apparatus is to be maintained at a high enough velocity to ensure that particulate material does not fall out of entrainment, resulting in saltation.

As discussed above, the apparatus 10 may have multiple types of gas guide or guide passages 22, each configured for creating a specific type or direction of gas flow into the drying chamber, for interaction with the flow path of particulate material (e.g. with the intention of achieving a different result within the flow path). In the illustrated embodiments, one type is intended to direct gas in a radial direction or substantially radial direction, with respect to the general direction of flow of material within the drying chamber (e.g. as the material travels between opposite ends of the drying chamber). It will be understood that the primary function of this ‘radial’ type is to create a blade or shaft of gas which intersects the flow of particulate material, thereby stripping moisture from the surface of particulate material as the material passes through the blade or shaft. In the illustrated embodiment, the other type is intended to direct gas in a tangential direction (essentially in a rotational sense), with respect to the general direction of flow of material within the drying chamber (e.g. as the material travels between opposite ends of the drying chamber). The primary function of this ‘tangential/rotational’ type is to help cause the particulate material to ‘spin’, so that the particulate material is helped to travel along the drying chamber in a helical manner.

In exemplary embodiments (such as in the illustrated embodiments), the first type of gas guide is configured for directing a shaft or blade of gas into the drying chamber in a plane strictly perpendicular to the direction of flow of material within the drying chamber. However, in other embodiments, there may be provided a type of gas guide which is configured for directing a shaft or blade of gas into the drying chamber in an axial direction which is at an angle to the perpendicular, e.g. so as to emit the shaft or blade of gas in a generally rearward direction (i.e. against the direction of flow of material within the drying chamber), or in a generally forward direction (i.e. with the direction of flow of material within the drying chamber). The primary function is still to create a blade or shaft of gas which intersects the flow of particulate material, thereby stripping moisture from the surface of particulate material as the material passes through the blade or shaft. However, these ‘angled’ blades or shafts of gas may increase the degree of moisture which is stripped from the particulate material as it passes through the respective section of the drying chamber, by promoting oblique contact with the particulate material, or simply (in the case of a 'rearward' direction) by acting in a direction which is opposite to the general direction of flow of the particulate material between opposing ends of the drying chamber.

Such angled or axial configurations may still have a significant radial component (e.g. if angled at less than 45 degrees from the perpendicular plane). Moreover, they may have increased moisture stripping capabilities if angled greater than 45 degrees from the perpendicular plane, on the basis that this will create a 'counterflow' effect, which can 'shock' the particulate material in the flowpath as it travels in the opposite direction from the first end of the chamber to the second end of the chamber.

The drying chamber may be configured with an array of gas guides, arranged in series along the drying chamber, and configured to provide a combination of shafts or blades of gas either strictly perpendicular and/or rearward and/or forward with respect to the intended direction of particulate flow along the drying chamber, in order to vary the moisture stripping capabilities of the drying chamber.

In exemplary embodiments, the angled-type gas guide is configured for directing the gas at an angle in the region of 25-65 degrees from perpendicular (e.g. 30-60 degrees from perpendicular).

In exemplary embodiments (such as the illustrated embodiments), the second type of gas guide is configured for directing tangential/rotational gas flow in a plane strictly perpendicular to the direction of flow of material within the drying chamber. However, in other embodiments, there may be provided a type of gas guide configured for directing such tangential or rotational gas flow in a direction which is at an angle to the perpendicular, e.g. so as to emit the gas flow in a generally rearward direction (i.e. 'against' the direction of flow of material within the drying chamber) or in a generally forward direction (i.e. 'with' the direction of flow of material within the drying chamber).

The primary function of this 'tangential/rotational' type is still to help cause the particulate material to 'spin'. However, the 'rearward' variant has been found to 'shock' the flow of particulate material travelling through the drying chamber, by inducing a counter-spin effect, thereby inducing aggressive surface moisture removal from the particulate material. The 'forward' variant has been found to promote linear momentum and helical flow of the particulate material in the intended direction along the drying chamber, and so can be particularly advantageous if used during early stages of the drying chamber (i.e. adjacent the inlet for the particulate material, when the material will have a higher bulk density and moisture content), as well as if used immediately after a 'rearward' configuration of the second type of gas guide (i.e. in order to help re-promote helical flow in the desired direction of travel along the drying chamber, after the reverse 'shock' effect).

Again, the drying chamber may be configured with an array of gas guides, arranged in series along the drying chamber, and configured to provide a combination of strictly perpendicular and/or counterflow and/or pro-flow rotational effects, in order to vary the moisture stripping capabilities of the drying chamber.

In exemplary embodiments, the gas guides are configured for directing the rotational gas at an angle in the region of 25-65 degrees from perpendicular (e.g. 30 to 60 degrees from the perpendicular).

It will be understood that the types of gas guide/guide passage referred to herein can be provided in a number of different ways, e.g. formed between a cooperating pair of elements brought together, or machined through solid material, etc. Other examples are possible in other embodiments, such as using discrete nozzles etc., configured to produce each desired type of gas guide.

The 'forward' or 'rearward' configurations can be achieved in many different ways, e.g. by having a specially directed mouth 38 or nozzle from which the gas enters the drying chamber, or by configuring the passage 32 within the body along which the gas flows in such a manner that the gas enters the chamber at the desired angle.

In view of the above discussion, it will be understood that exemplary embodiments have a drying chamber which defines a longitudinal axis (typically, intended to be at least generally horizontal—as opposed to vertical—in use, as is the same for all of the embodiments described herein), and wherein a first type of gas guide or guide passage is of a type configured to direct a blade or shaft of gas into the drying chamber for the purpose of intersecting the flow of material travelling along the drying chamber (e.g. in a radial or axial direction with respect to said longitudinal axis), and a second type of gas guide or guide passage is of a type configured to direct gas into the drying chamber in a direction intended to travel about the longitudinal axis within the drying chamber, in order to create a spinning effect. However, certain embodiments may benefit from a combination of only the first or only the second type of gas guide or guide passage.

It will be understood that the 'rotational/tangential' types of gas guide described above (whether 'forward', 'rearward', or 'perpendicular') can be configured for imparting a clockwise or anti-clockwise rotational effect on the particulate material passing along the drying chamber. It has been found that the use of a rotational effect which is 'counter' to the primary rotational sense of the helical flow of particulate material passing between opposite first and second ends of the drying chamber (e.g. in a manner which seeks to reverse the primary rotational direction of flow) can also provide improvements in surface moisture reduction, by creating a 'shock' to the particulate material passing along the drying chamber. Hence, exemplary embodiments are provided in which the apparatus is configured so that the overall intended helical flow of particulate material passing along the drying chamber is in a first rotational direction (e.g. clockwise), and wherein the drying chamber includes one or more gas guides, wherein the one or more gas guides are specifically configured to direct gas in a rotational/tangential manner (whether 'forward', 'rearward' and 'perpendicular'), in a second rotational direction which is counter to said first rotational direction (e.g. anti-clockwise). Advantageously, the drying chamber may be provided with one or more of such types of gas guide, at a location immediately downstream of the 'reverse rotation' gas guide, but configured to re-promote helical flow in said first rotational direction. It will be understood that the moisture removing capability of the 'reverse' rotational gas guide can improved if configured so that the gas is directed in a 'rearward' direction. Similarly, it will be understood that the flow-promoting capability of the further (downstream) gas guide can be improved if configured so that the gas is directed in a 'forward' direction. In exemplary embodiments, the gas guides or guide passages direct gas under pressure into the drying chamber from the body of modular construction.

The apparatus described herein is suitable for processing a wide range of gas-entrained particulate materials, such as coals, sand, biomass, ash and lignite etc.

Although the invention has been described above with reference to one or more exemplary embodiments, it will be appreciated that various changes or modifications may be made without departing from the scope of the invention as defined in the appended claims.

The invention claimed is:

1. Apparatus for removing moisture from particulate material, comprising:

a dryer housing having an input opening and an output opening, the drying housing defining a flow path for gas-entrained particulate material, the flow path extending between the input opening and the output opening of the dryer housing; and a drying chamber within the dryer housing, the dryer chamber defining a channel, wherein the flow path for the gas-entrained particulate material extends along the channel, wherein the drying chamber is configured for directing a flow of gas-entrained particulate material between first and second ends of the drying chamber; and wherein the dryer housing is configured for directing gas under pressure into the drying chamber, and for interacting with the flow of gas-entrained particulate material within the drying chamber;

wherein the drying chamber comprises a body of modular construction, which defines a plurality of guide passages arranged for fluid communication between the drying chamber and a source of gas under pressure;

and further wherein the body of modular construction comprises a plurality of discrete annular elements, each having a body with a front face, a back face, and a circumferential radially outer surface extending between the front and back faces, the body defining a central aperture passing from the front face to the back face, and wherein the annular elements are arranged with the central apertures aligned so as to define a bore of the drying chamber, the bore defining the channel, wherein the apparatus is configured for adjusting spacing between the discrete elements.

2. The apparatus of claim 1, wherein the annular elements are configured to cooperate in one or more pairs, one annular element adjacent another, so that the central apertures from each pair of the one or more pairs define at least part of the bore of the drying chamber.

3. The apparatus of claim 2, wherein a pair of the plurality of annular elements defines at least one of said guide passages, extending between first and second elements of said pair, and configured for directing gas under pressure from between said pair and into the drying chamber.

4. The apparatus of claim 1, wherein the drying chamber is arranged in fluid communication with the source of gas under pressure, via the guide passages between respective pairs of said annular elements.

5. The apparatus of claim 1, wherein the dryer comprises a first type of guide passage in fluid communication with said drying chamber, wherein said first type of guide passage is configured for directing gas under pressure in a radial or axial direction with respect to a longitudinal axis of the drying chamber, or in a radial or axial direction with respect to a general direction of flow of gas-entrained particulate material between said first and second ends of the drying chamber.

6. The apparatus of claim 5, wherein the first type of guide passage has an outlet which is continuous through 360 degrees.

7. The apparatus of claim 1, wherein the dryer comprises a second type of guide passage in fluid communication with said drying chamber, wherein said second type of guide passage is configured for directing gas under pressure in a tangential or rotational direction with respect to a longitudinal axis of the drying chamber, or in a tangential or rotational direction with respect to a general direction of flow of gas-entrained particulate material between said first and second ends of the drying chamber.

8. The apparatus of claim 1, wherein the dryer comprises a first type of guide passage in fluid communication with said drying chamber, wherein said first type of guide passage is configured for directing gas under pressure in a radial direction with respect to a longitudinal axis of the drying chamber, or in a radial direction with respect to a general direction of flow of gas- entrained particulate material between said first and second ends of the drying chamber;

and wherein the dryer further comprises a second type of guide passage in fluid communication with said drying chamber, wherein said second type of guide passage is configured for directing gas under pressure in a tangential or rotational direction with respect to a longitudinal axis of the drying chamber, or in a tangential or rotational direction with respect to a general direction of flow of gas-entrained particulate material between said first and second ends of the drying chamber; and wherein the dryer is configured such that one or more of said second type of guide passage is arranged in series downstream of at least one of said first type of guide passage.

9. The apparatus of claim 1, wherein the apparatus has multiple types of gas guide or guide passages for directing gas to interact with the flow of gas-entrained particulate material within the drying chamber, wherein each type of gas guide or guide passage is configured for creating a specific type or direction of gas flow into the flow path of particulate material travelling along the drying chamber.

10. The apparatus of claim 9, wherein the drying chamber defines a longitudinal axis, wherein a first type of gas guide or guide passage is of a type configured to direct a blade or shaft of gas into the drying chamber for a purpose of intersecting the flow of material travelling through the drying chamber and a second type of gas guide or guide passage is of a type configured to direct gas into the drying chamber in a direction intended to travel about the longitudinal axis within the drying chamber, in order to create a spinning effect, wherein the first type of gas guide is different to the second type of gas guide.

11. The apparatus of claim 10, wherein said first type of gas guide or guide passage and/or said second type of gas guide or guide passage is configured for directing the flow of gas into the drying chamber in a plane perpendicular to the direction of flow of material within the drying chamber, or at an angle to the perpendicular.

12. The apparatus of claim 1, wherein the apparatus is configured to create a helical flow of particulate material passing along the drying chamber between said first end and said second end in a first rotational direction; and further wherein the drying chamber includes one or more gas guides or guide passages for directing gas under pressure into the drying chamber from the body of modular construction, for interacting with the flow of gas-entrained particulate material within the drying chamber, wherein said one or more gas guides or guide passages is configured to direct gas in a generally tangential or rotational manner, in a second rotational direction which is counter to said first rotational direction, in order to create a reverse spin effect within the flow of gas-entrained particulate material.

13. A method of removing moisture from particulate material, comprising:

providing a drying chamber having first and second ends;

directing a flow of gas-entrained particulate material between said first and second ends of the drying chamber;

directing gas under pressure into the drying chamber, in order to interact with the flow of gas-entrained particulate material within the drying chamber;

wherein the flow of gas-entrained particulate material is directed to follow a helical flow path in a first rotational sense from said first end of the drying chamber to the second end of the drying chamber; and wherein gas under pressure is directed into the drying chamber at a first location between said first and second ends of the drying chamber, in a rotational or tangential manner with respect to the direction of travel of the particulate material between said first and second ends, but in a second rotational sense which is counter to said first rotational sense, in order to shock the flow of particulate material moving between the first and second ends of the drying chamber.

14. The method of claim 13, further wherein gas under pressure is directed into the drying chamber at a second location between said first and second ends of the drying chamber, wherein said second location is downstream from said first location, and wherein said gas at said second location is directed in a rotational or tangential manner with respect to the direction of travel of the particulate material between said first and second ends, but in said first rotational sense, in order to re-promote the direction of helical flow of particulate material moving between the first and second ends of the drying chamber.

15. Apparatus for removing moisture from particulate material, comprising:

a dryer housing having an input opening and an output opening, the dryer housing defining a flow path for gas-entrained particulate material, the flow path extending between the input opening and the output opening of the dryer housing; and a drying chamber within the dryer housing, the drying chamber defining a channel, wherein the flow path for the gas-entrained particulate material extends along the channel, wherein the drying chamber is configured for directing a flow of gas-entrained particulate material between first and second ends of the drying chamber; and wherein the dryer housing is configured for directing gas under pressure into the drying chamber, and for interacting with the flow of gas-entrained particulate material within the drying chamber;

wherein the drying chamber comprises a body of modular construction, which defines a plurality of guide passages arranged for fluid communication between the drying chamber and a source of gas under pressure;

and further wherein the body of modular construction comprises a plurality of discrete annular elements, each having a body defining a central aperture, and wherein the annular elements are arranged with the central apertures aligned so as to define a bore of the drying chamber, the bore defining the channel;

wherein the apparatus is configured to create a helical flow of particulate material passing along the drying chamber between said first end and said second end in a first rotational direction; and further wherein the drying chamber includes one or more gas guides or guide passages for directing gas under pressure into the drying chamber from the body of modular construction, for interacting with the flow of gas-entrained particulate material within the drying chamber, wherein said one or more gas guides or guide passages is configured to direct gas in a generally tangential or rotational manner, in a second rotational direction which is counter to said first rotational direction, in order to create a reverse spin effect within the flow of gas-entrained particulate material.

* * * * *